United States Patent [19]
McClocklin

[11] 3,892,259
[45] July 1, 1975

[54] ROTARY CONTROL VALVE

[75] Inventor: Samuel B. McClocklin, Owatonna, Minn.

[73] Assignee: Owatonna Tool Company, Owatonna, Minn.

[22] Filed: Jan. 16, 1974

[21] Appl. No.: 433,799

[52] U.S. Cl. ........ 137/625.21; 137/625.46; 251/286
[51] Int. Cl. .................... F16k 11/02; F15b 13/04
[58] Field of Search ..... 137/625.21, 625.23, 625.24, 137/625.43, 625.46; 251/172, 283, 313, 311, 286, 304

[56] References Cited
UNITED STATES PATENTS

| | | | |
|---|---|---|---|
| 1,052,173 | 2/1913 | Reece | 137/625.21 |
| 1,852,123 | 4/1932 | Lutsky | 137/625.21 X |
| 2,233,192 | 2/1941 | Armington | 137/625.46 X |
| 2,344,913 | 3/1944 | Ager | 137/625.21 |
| 2,564,529 | 8/1951 | Griswold | 137/625.21 |
| 2,567,428 | 9/1951 | Greeley | 137/625.21 |
| 2,952,243 | 9/1960 | Dunning | 137/625.21 X |
| 3,036,599 | 5/1962 | Doerpler | 137/625.24 |
| 3,198,477 | 8/1965 | Allenbaugh Jr. | 251/286 X |
| 3,330,301 | 7/1967 | Ludwig | 137/625.21 X |
| 3,802,457 | 4/1974 | Wurzburger | 251/286 |

*Primary Examiner*—Martin P. Schwadron
*Assistant Examiner*—Robert J. Miller
*Attorney, Agent, or Firm*—Wegner, Stellman, McCord, Wiles & Wood

[57] ABSTRACT

A rotary control valve for directional control having a valve body and valve member with coacting generally planar surfaces with a plurality of ports in the valve body opening to the surface thereof and with the valve member having a pair of fluid passage grooves, one of which extends through the axis of rotation of the valve member which is concentric with the inlet port of the valve body, said one groove extending equal distances from said axis to connect the inlet port to one or the other of a pair of control ports and a second fluid passage groove in the valve member extending to the periphery of the valve member for connecting the other of said control ports to a return port whereby rotative positioning of the valve member supplies pressure fluid to one or the other of the control ports and with radial balance distribution of forces in the first passage groove to avoid off-center loading. Additionally, means directs inlet pressure to act on the valve member in a direction urging the valve member planar surface against the planar surface of the valve body.

10 Claims, 7 Drawing Figures

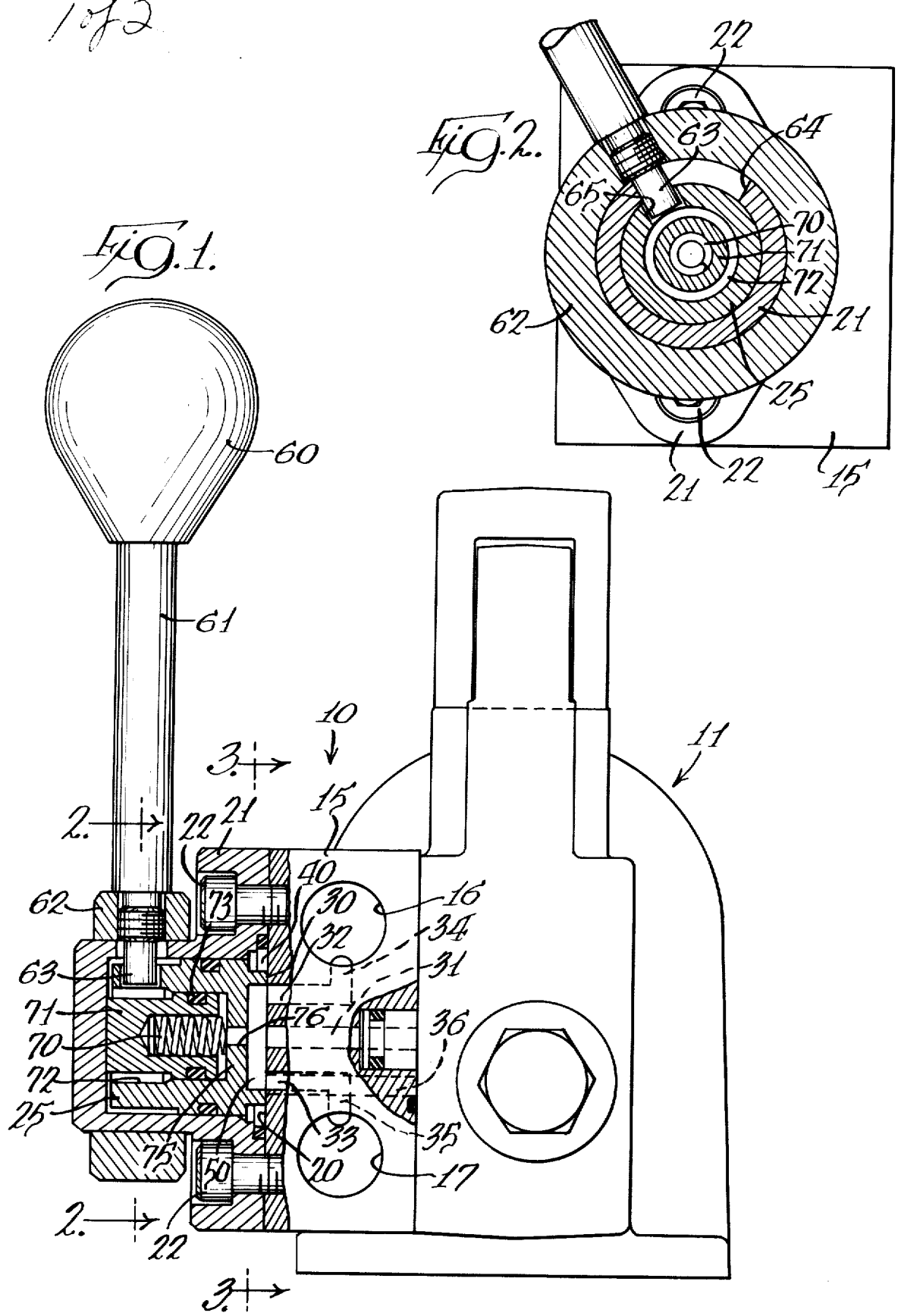

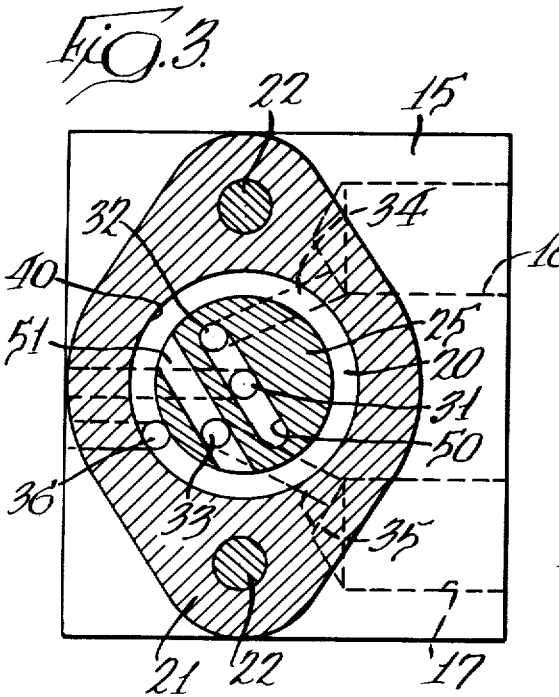
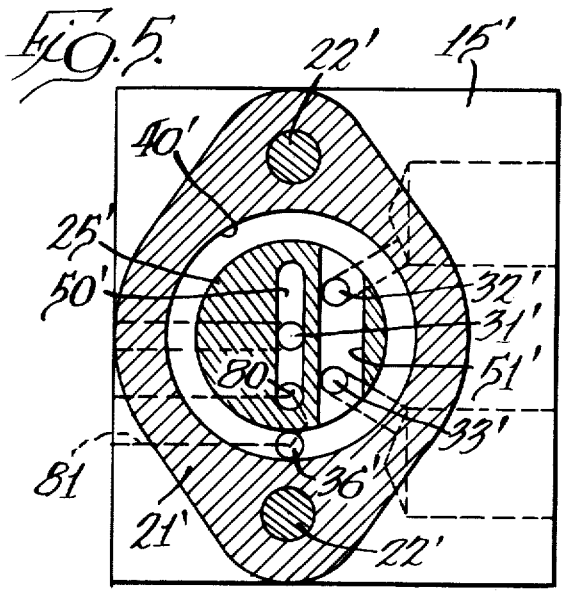
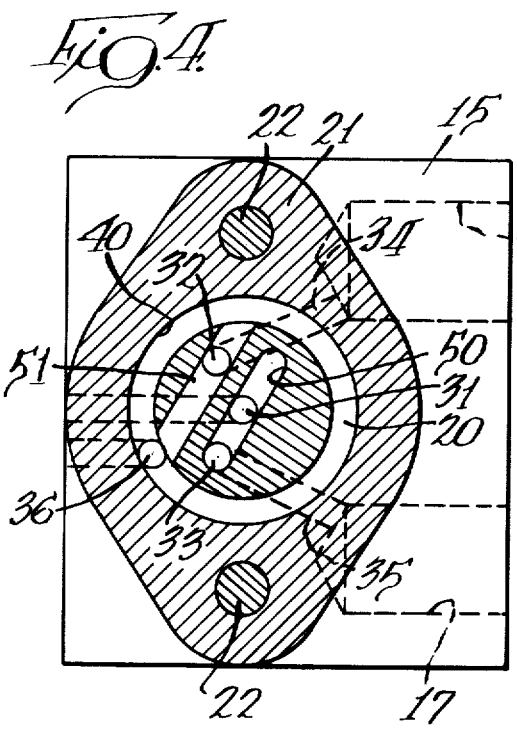
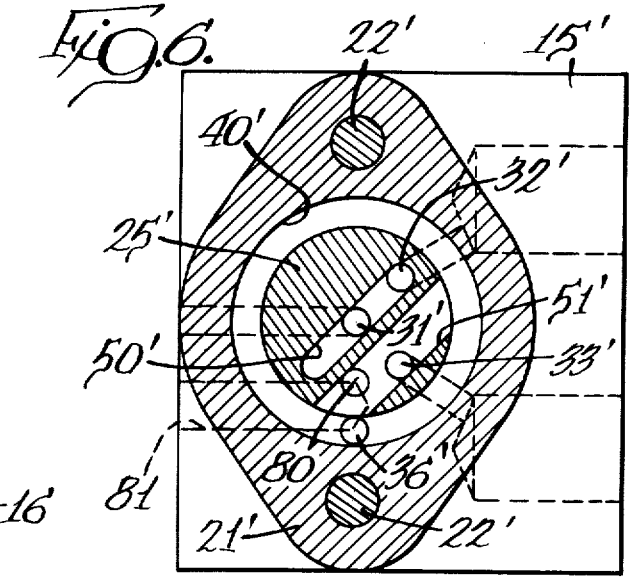
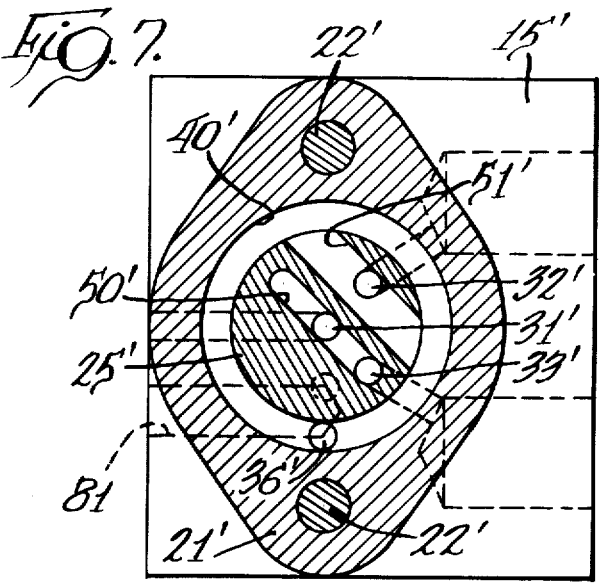

ROTARY CONTROL VALVE

BACKGROUND OF THE INVENTION

This invention pertains to a compact rotary directional control valve operable at high pressures for controlling the flow to a pair of control ports.

Rotary directional control valves are commonly used in high pressure systems wherein a valve member may be manually positioned to any one of two or three different control positions to control flow to and from a pair of control ports. The assignee of this application has manufactured and sold rotary directional control valves of this general type for several years. Additionally, such valves are known in the prior art, with an example being shown in Bates U.S. Pat. No. 2,925,095. Such prior art structures have had problems with off-center loading, resulting in leakage and difficulty in positioning of the valve member. Additionally, such prior constructions have been relatively complex and expensive to manufacture.

SUMMARY

A primary feature of the invention disclosed herein is to provide a rotary valve, such as a directional valve, wherein the valve member is subjected only to centered loading to minimize leakage and facilitate manual positioning of the valve member in any one of the selected control positions.

Another feature of the invention is to provide a rotary valve having a valve member and a valve body with coacting, generally planar surfaces, with the ports provided in the valve body and opening to the surface thereof and with the inlet and return port connections to the control ports being controlled by positioning of the valve member about an axis of rotation concentric with the inlet port and with first and second fluid passage means formed in the valve member to provide said fluid connections.

Still another feature of the invention is to provide a valve as defined in the preceding paragraph wherein the first passage means is a groove opening to the surface of the valve member which passes through the axis of rotation of the valve member and with said groove extending to opposite sides of said axis of rotation equal distances to have pressure forces centered on the valve member and with the second passage means being a second groove opening to the surface of the valve member and extending generally parallel to the first groove and opening at its ends to the perimeter of the valve member.

Additionally, the valve has means for urging the valve member against the valve body, including spring means disposed within a chamber in the valve member urging the valve member toward the body and with means for directing pressure from the inlet port to said chamber to expose pressure against an area of the valve member greater than said first groove of the valve member whereby there is a force overbalance sufficient to urge the surfaces of the valve member and valve body into contact and with said surfaces having a very smooth flat finish as provided by lapping.

Still another feature of the invention is to provide for use of the valve member with a rotary control valve having different numbers of control positions.

BRIEF DESCRIPTION OF THE DRAWINGS

FIG. 1 is an end elevational view of the control valve shown in association with a pump-reservoir unit with parts broken away and with parts shown in central vertical section;

FIG. 2 is a vertical section, taken generally along the line 2—2 in FIG. 1;

FIG. 3 is a vertical section, taken generally along the line 3—3 in FIG. 1, showing the control valve in one of its control positions;

FIG. 4 is a view, similar to FIG. 3, showing the control valve in the other of its control positions;

FIG. 5 is a view, similar to FIG. 3, showing the construction of the valve body for coacting with the valve member in a three-position version of the control valve;

FIG. 6 is a view, similar to FIG. 5, showing the three-position control valve in a position to one side of the neutral position of FIG. 5; and FIG. 7 is a view, similar to FIG. 5, showing the three-position version of the control valve in a position to the other side of neutral from the position shown in FIG. 6.

DESCRIPTION OF THE PREFERRED EMBODIMENTS

The rotary control valve is indicated generally at 10 in FIG. 1 and is shown in association with a pump-reservoir unit, indicated generally at 11, which provides pressure fluid at a relatively high pressure up to 10,000 p.s.i. and which has a reservoir for receiving fluid returned from the valve. The rotary control valve is specifically shown as a directional valve wherein a valve body 15 has outlet port connections 16 and 17 connectable to a cylinder for controlling the action thereof. The valve body 15 has a generally planar surface 20 enclosed by a cover 21 which is secured to the valve body by machine screws 22. The cover 21 is cup-shaped to provide a space rotatably mounting a valve member 25. The valve member 25 has a generally planar surface 30 facing the generally planar surface 20 of the valve body 15. These two surfaces are hardened, ground and lapped to a very smooth, flat finish. The valve member 25 is rotatable about an axis of rotation extending normal to said generally planar surfaces and which is concentric with an inlet port 31 in the valve body extending to the surface thereof for delivering pressure fluid to the valve member.

The valve body 15 additionally has a pair of control ports 32 and 33 opening to the surface 20 of the valve body and connected to the outlet port connections 16 and 17, respectively, by passages 34 and 35. A return port 36 opens to the surface 20 of the valve body and communicates with the reservoir. The control ports 32 and 33 are located equidistant from and at sides opposite the inlet port 31, while the return port 36 is located at the greatest distance from the inlet port 31 and, as shown particularly in FIG. 3, is in alignment with an annular space 40 between the outer periphery of the valve member 25 and the inner periphery of the cover 21.

The valve member 25, in the embodiment of FIGS. 1 to 4, has first fluid passage means for connecting the inlet port 31 to either one of the control ports 32 and 33, with the other of the last-mentioned control ports being connected to the return port 36 by second fluid passage means. More specifically, the first fluid passage means comprises a groove 50 formed in the valve member 25 and opening to the surface thereof to communicate with the inlet port 31. The groove 50 extends through the axis of rotation of the valve member and for equal distances to opposite sides thereof but ends short of the perimeter of the valve member. These dimensions of the groove 50 provide for communication between the inlet port 31 and either of the control ports 32 and 33, dependent upon the rotative position of the valve member 25, as will be seen by comparing FIGS. 3 and 4, and, additionally, assures that forces acting on the valve member 25, resulting from inlet fluid pressure, are centered to avoid off-center loading of the valve member. The second fluid passage means comprises a second groove 51 extending parallel to the groove 50 and offset therefrom, with the second groove opening to the valve member surface and through the periphery of the valve member to have the opposite ends thereof in communication with the space 40 surrounding the valve member. The second groove 51 places one of the control ports in communication with the return port 36.

More specifically, with the valve member 25 in one of its two positions, and as shown in FIG. 3, pressure fluid delivered through inlet port 31 is directed to outlet port connection 16 by flow through the first groove 50 to the control port 32. Return flow from outlet port connection 17 flows to the control port 33 and through groove 51 to the return port 36. When the valve member 25 is in the second of its rotative positions, as shown in FIG. 4, inlet port 31 is connected to outlet port connection 17 by the first groove 50 and control port 33, while outlet port connection 16 is connected to return port 36 through control port 32 and the second groove 51.

The two positions of the valve member 25 are obtained by manual actuation of a handle 60 having a rod 61 fastened to an annular collar 62 surrounding the cover 21 and mounted for rotation thereon. A pin 63 at the inner end of the handle extends through an elongate diametral slot 64 in the cover 21 and into loose engagement with an opening 65 in the valve member 25. Rotation of the handle 60 places the valve member 25 in either of two positions as determined by the limits of arcuate movement of the handle pin 63 within the elongate slot 64. The loose connection to the valve member 25 permits the valve member surface 30 to maintain close contact with the valve body surface 20.

The contact of the surfaces of the valve body and valve member is initially maintained by a spring 70 fitted within a recess in a reaction member 71 abutting against the cover 21 and positioned within a chamber 72 in the valve member 25. An O-ring 73 maintains a seal between these two parts. The spring 70 acts between the reaction member 71 and a wall 75 of the valve member to urge the valve member toward the right, as viewed in FIG. 1.

In operation, the valve member 25 is held against the valve body by pressure. A passage 76 through the wall 75 of the valve member communicates the groove 50 with the chamber of the valve member. Pressure fluid in the space between the reaction member 71 and the wall 75 of the valve member acts against the wall 75, which has an area slightly larger than the area of the groove 50, to provide an overbalance of force holding the generally planar surfaces in contact. This overbalance of force is only enough to maintain contact between said surfaces without leakage since excessive overbalance would increase friction and make the valve difficult to rotate.

The embodiment of FIGS. 5 to 7 differs from the embodiment of FIGS. 1 to 4 in disclosing a three-position version of the valve wherein the valve has a neutral position, as shown in FIG. 5, to allow pressure fluid to return to the reservoir and with both outlet port connections being open to the return port.

In the embodiment of FIGS. 5 to 7, parts which are the same as those in the embodiment of FIGS. 1 to 4 are given the same reference numeral with a prime affixed thereto.

In this embodiment, the control ports 32' and 33' have been shifted from their positions of FIG. 3 whereby in the neutral position shown in FIG. 5 the second groove 51' cross-connects said control ports and the open ends of said second groove communicate with the return port 36'. Additionally, there is a second return port 80 which coacts with the return port 36' and which communicates with a common return passage 81. The inlet port 31' communicates with the return passage 81 through the first groove 50' of the valve member in the position of FIG. 5. In the control position of FIG. 6, the valve member 25' has been rotatably shifted from the neutral position to have the first groove 50' connect the inlet port 31' with the control port 32'. The second groove 51' connects the control port 33' with the return ports 36' and 80. In the third position which is rotatively to the opposite side of neutral from the position shown in FIG. 6 and as shown in FIG. 7, the inlet port 31' is connected with the control port 33'. The control port 32' is connected with the return port 36' by the second groove 51'.

The rotary directional control valves disclosed herein represent two embodiments of such valves using a relatively simple port plate type valve member having forces always centered and eliminating off-center loading with pressure hold-down of the valve member against the valve body. Other porting arrangements for a control valve could be achieved using the same principles.

I claim:

1. A rotary control valve having a body and a valve member with opposing generally planar contacting surfaces, means mounting the valve member for rotation about a central axis normal to said surfaces, a plurality of ports in said body opening to said surface thereof including a pressure port concentric with said axis, an annular space around the periphery of said valve body, a return port connecting with said annular space, a pair of control ports, said valve member having a first fluid passage groove opening to the body surface and extending through and with ends equidistant from said central axis to connect said pressure port with one or the other of said control ports, a pressure chamber in said valve member having a pressure responsive area, a reaction member in said pressure chamber, a passage connecting said groove and said pressure chamber whereby fluid pressure acting against the reaction member and the pressure responsive area urges the valve member toward said body surface, and said valve member having a second fluid passage groove to connect one of said control ports to the annular space and to the return port.

2. A rotary control valve as defined in claim 1 wherein said second fluid passage groove includes a groove opening to the body surface and extending parallel to said first-mentioned groove and at both ends extending to the annular space around the perimeter of said valve member.

3. A rotary control valve as defined in claim 1 wherein said pressure chamber has a spring therein for urging said valve member toward said body surface.

4. A rotary control valve as defined in claim 1 wherein said valve member has two rotative positions to connect the inlet port to one or the other of the control ports.

5. A rotary directional valve operable at high pressure comprising, a valve body and a cover defining a space enclosing a generally planar surface of said body, a valve member positioned within said space for rotation about an axis and having a generally planar surface contacting said surface of the valve body, said valve member having a peripheral annular wall at the side opposite said planar surface defining a chamber, a reaction member positioned in said chamber and being supported by said cover, spring means in said chamber acting between said reaction member and said valve member for urging the planar surfaces into contact, a plurality of ports opening to said valve body surface including an inlet port concentric with said axis, a return port at a distance from said inlet port and at a location beyond the perimeter of the valve member and a pair of control ports positioned one to either side of the inlet port, a first straight groove at the surface of said valve member extending through said axis and extending equal distances toward but short of the periphery of the valve member, a passage in said valve member placing said chamber in fluid communication with the first groove, said chamber having a face with an area slightly larger than the area of said first groove whereby a pressure force acting on said face increases as inlet fluid pressure increases and combines with said spring means to urge said generally planar surfaces together, and a second groove in the surface of said valve member spaced from the first groove and extending to the periphery of the valve member into communication with said return port beyond said perimeter of the valve member.

6. A rotary directional valve as defined in claim 5, wherein said valve member has two rotative positions and said two control ports are positioned to have one control port in communication with the second groove and the other control port in communication with the first groove in both positions of the valve member.

7. A rotary directional valve operable at high pressure comprising, a valve body and a cover defining a space enclosing a generally planar surface of said body, a valve member positioned within said space for rotation about an axis and having a generally planar surface contacting said surface of the valve body, said valve member having a chamber with spring means therein urging the surfaces into contact, a plurality of ports opening to said valve body surface including an inlet port concentric with said axis, a return port at a distance from said inlet port and at a location beyond the perimeter of the valve member and a pair of control ports positioned one to either side of the inlet port, a first groove at the surface of said valve member extending through said axis and extending equal distances toward but short of the periphery of the valve member, a second groove parallel to the first groove and extending to the periphery of the valve member, said valve member has three rotative positions and with the control ports positioned to have one or both thereof in communication with the second groove in all three rotative positions, and an additional return port in said valve body, said first groove always communicating with the inlet port and with either a control port or the additional return port in the three rotative positions of the valve member.

8. A rotary directional valve as defined in claim 5 including means extending through said cover for rotating said valve member.

9. A rotary directional valve operable at high pressure comprising, a valve body and a cover defining a space enclosing a generally planar surface of said body, a valve member positioned within said space for rotation about an axis and having a generally planar surface contacting said surface of the valve body, said valve member having a chamber with spring means therein urging the surfaces into contact, a plurality of ports opening to said valve body surface including an inlet port concentric with said axis, a return port at a distance from said inlet port and at a location beyond the perimeter of the valve member and a pair of control ports positioned one to either side of the inlet port, a first groove at the surface of said valve member extending through said axis and extending equal distances toward but short of the periphery of the valve member, a passage in said valve member placing said chamber in communication with the inlet port, a reaction member in said chamber supported by said cover, said chamber having a wall with an area greater than the area of said first groove whereby a force urges said generally planar surfaces together, means extending through said cover for rotating said valve member, said means includes a collar rotatable on said cover, an elongate slot in said cover covered by said collar, and a handle fastened to said collar and with a pin extending through said slot and loosely fitted in said valve member.

10. A rotary control valve having a body and a valve member with opposing generally planar contacting surfaces, means mounting the valve member for rotation about a central axis normal to said surfaces, a plurality of ports in said body opening to said surface thereof including a pressure port concentric with said axis, a return port and a pair of control ports, said valve member having a first fluid passage means extending through and with ends equidistant from said central axis to connect said pressure port with one or the other of said control ports, said valve member having second fluid passage means to connect a control port to the return port, said valve body having a second return port, and said valve member having three rotative positions with two of said positions connecting the inlet port to one or the other of said control ports and the third position connects the inlet port to the second return port.

* * * * *